United States Patent [19]

Frew et al.

[11] Patent Number: 5,037,710
[45] Date of Patent: Aug. 6, 1991

[54] ANTI-SPIN-OFF COATING FOR DISC RECORDS

[75] Inventors: Duncan W. Frew, Alamo; Robert P. Shadwick, San Jose, both of Calif.

[73] Assignee: Unisys Corp., Detroit, Mich.

[21] Appl. No.: 370,423

[22] Filed: Jun. 23, 1989

Related U.S. Application Data

[63] Continuation of Ser. No. 918,639, Oct. 15, 1986, which is a continuation of Ser. No. 772,967, Sep. 4, 1985.

[51] Int. Cl.⁵ .............................................. H01F 10/02
[52] U.S. Cl. ..................................... 428/695; 427/128; 427/130; 427/131; 427/352; 428/64; 428/694; 428/696; 428/900

[58] Field of Search ................................ 427/127–132, 427/48, 352, 385.5, 407.1; 428/695.64, 900, 694, 696, 434, 336

[56] References Cited

U.S. PATENT DOCUMENTS 4,797,303 1/1989 Frew et al. .......................... 427/131

Primary Examiner—Bernard Pianalto
Attorney, Agent, or Firm—John J. McCormack; Mark T. Starr

[57] ABSTRACT

Magnetic recording media wherein the record surface is coated with an isocyanate lubricant (and, preferably, a supercoat of like lubricant), such lubrication being adapted to inhibit spin-off and like depletion, despite frequent head-contact, while exhibiting good durability, wear resistance and recording characteristics over extended life (computer applications).

24 Claims, No Drawings

ANTI-SPIN-OFF COATING FOR DISC RECORDS

This is a continuation of application Ser. No. 918,639 filed 15 October 1986, which is in turn, a continuation of U.S. Ser. No. 772,967 filed 4 September 1985.

This invention relates to lubricants for magnetic recording compositions (e.g., as coated on a rigid data disc or like substrate), and more particularly to such including an improved surface lubricant system adapted therefor.

BACKGROUND, FEATURE OF INVENTION

Workers in the art of making and using magnetic recording apparatus for data processing and the like are well aware that the media therefor often present serious wear problems, such as may foreshorten their useful life. For instance, with rigid magnetic recording disc surfaces which support a thin-film magnetic recording head (carried on a "slider") passing at relatively high speeds, the head is all too apt to problematically abrade both itself and the medium.

A related problem is that of undesirably high friction between the disc and head (surfaces). To ameliorate abrasion, workers typically specify that a disc coating exhibit no more than a certain (maximum) coefficient of friction—this also reduces the force necessary to drive the disc past the head. To reduce friction and enhance wear, workers have resorted to various expedients such as "surface-(topical) lubricant" coatings on the disc's recording surface.

This invention is also concerned with such surface lubricants, and with techniques for affixing the lubricants to such record surfaces, preferably by chemical bonding.

Workers recognize the problems using such surface lubricants (on the surface of information carrying media such as magnetic recording discs and tapes). Such lubricants may be applied to a record surface, and held there, by purely mechanical means, for example, by capillary forces. Publications which illustrate physical retention of a lubricant on a solid surface include, for example, U.S. Pat. Nos. 4,188,434; 4,232,072 and 4,268,556. In these patents, no chemical bond is taught between the surface lubricant and the underlying surface.

According to the present invention, a prescribed isocyanate lubricant is applied to a record surface and cured there for a stable firmly-attached, chemically-bonded polymeric lubricant (contact disc with an isocyanate-terminated lube).

Generally "surface lubricants" as here understood are chemically inert and thus exhibit little adherent interaction (such as hydrogen bonding or polar group interaction) with the record surface. Because of such loose adhesion when a record disc, as here understood, is rotated at high speed, the lubricant tends to migrate from the disc (e.g., adhesion forces being gradually overcome by the centrifugal force), and thus the lubricants are spun-off and depleted, with consequent likelihood of "head crash".

According to the present invention, such lube depletion is inhibited by application of a thin film of isocyanate lubricant to the information carrying surface, this film being so chemically-bonded to the surface as to not be readily removed (e.g., by washing or rubbing with isopropanol). Record surfaces apt for this include, for example, magnetic discs, magnetic tapes, sound recording media and the like, especially certain compatible polymeric surfaces.

Such lubricant coatings are particularly apt for polymeric magnetic record disc surfaces (e.g., of the type used in computer recording), especially where the relative head-medium velocity is very high, and the head is highly abrasive (cf. thin film heads) and consequent abrasion and reduced life of both head and media is quite likely. Thus, workers have resorted to various known "surface-lubricant" means for such disc coatings and like media (e.g., see the following U.S. Pat. Nos.: 3,490,946; 3,492,235; 3,523,086; 4,431,702; 3,983,302; 3,837,912; 3,597,273; 4,446,193; also IBM TDB Vol. 26, #7B, p. 3778, December 1983; also article by Budinski in J. Vac. Sci. Technol. Vol. 12, #4, July-August 1975, pp. 786+; and article by Hamada, et al., J. Appl. Phys. 55(6), 15 March 1984, pp. 3775+.

Depletion of surface lubricant on a spinning magnetic recording disc is believed primarily due to "spin-off" initiated by centrifugal forces. Some subsurface lubricant (within the body of the magnetic coating itself) is at times suggested as a potential reservoir for replenishing the surface lubricant so spun-off.

Workers are aware of the "spin-off" problem and recognize that it commonly depletes surface lubricant prematurely inducing head-crash and system failure. A salient purpose of this disclosure is to inhibit such depletion by application and chemical bonding of an isocyanate-terminated (or acid-terminated) lubricant to a polymeric record surface, especially where the polymeric surface exhibits free, reactive groups (or can be induced so)—e.g., hydroxyl—which can chemically bond with the reactive isocyanate (or acid) groups, to yield urethane or ester bonds.

A related object is to match this isocyanate lube with the characteristics of a lubricant supercoat thereon (e.g., significant mutual solubility and mutual molecular attraction plus substantial inter-diffusion) for improved adhesion thereof and synergistic co-lubrication. Thus, the two lube layers of like composition and structure can, together, act to inhibit depletion of the top lubricant layer.

It is an object of this invention to address such problems and particularly to teach novel magnetic recording compositions including improved surface lubricant systems, especially for systems with rigid disc media and thin film heads.

For instance, compared with a standard ferric oxide computer disc coating in a certain polymeric binder, a novel lube reactive coating system according to our invention applied as a scant undercoat for normal surface lube will reduce spin-off and like depletion, and enhance durability and operating life—to the surprise of workers! (e.g., because our undercoat material is conventionally viewed as a lubricant—thus we are improving adhesion of a lube coat by a lube under-coat!). Such a reactive lube undercoat will include isocyanate-terminations. They also, preferably, include fluorocarbon moieties (preferably fluoro-alkyls such as fluoro-ether polymers); further they are preferably super-coated with a fluorocarbon lube system of similar structure. For instance, a preferred reactive coating comprises a diisocyanate-terminated perfluoro-poly-ether which is very apt for use with a super-coat lube including fluoro-ether constituents (less preferably, the fluoro-version may be substituted for the perfluoropolyether, but will typically be less stable; for instance, where hydrogen replaces fluorine, it will be more likely to react adversely, change properties, offer a point of corrosive attack, etc.)

Now workers have, of course, suggested fluorocarbon surface lubricants for magnetic recording surfaces. But such lubricants, in themselves and in general, are not necessarily effective in affording the kind of superior durability, stability and spin-off resistance we desire; also, in heavy concentrations they can badly impair magnetic performance (e.g., see U.S. Pat. No. 4,431,703).

Some workers have suggested various organic (e.g., organo-fluorine) compounds as lubricants for rigid magnetic recording media (e.g., see U.S. Pat. No. 3,993,846, or U.S. Pat. No. 4,007,314, or U.S. Pat. No. 4,131,717—or see U.S. Pat. No. 4,007,313 mentioning an organo-silicone-fluoride lubricant).

The tendency now is to increase density of recording using very thin magnetic media films having highly polished surfaces and using recording heads which fly practicallly in contact with (if not actually sliding-over) these films. This calls for substantial improvements in surface lubrication for such high-density magnetic media, with lubricant layer specifications becoming very stringent. Such a lubricating layer should be as thin as possible (order of magnitude of several dozen Å or more) and yet be very stable, long-lasting, effective and durable; it must not react with the record-binder lest it plasticize the record surface and, over all, it must not be removed or significantly depleted in use.

Common "migratory" lubricants (which are added to the bulk of the record coating) are now suspect under such circumstances; e.g., their migration rate cannot be controlled with sufficient precision; hence they cannot assure a surface lube-coat which is sufficiently uniform.

"Topic" or surface-applied lubricants (e.g., fluorocarbon oils) are now coming into favor for such media—indeed, in some cases, such as with thin film metallic media, workers feel there is no other conventional way to achieve superior surface lubrication.

As a feature hereof, such media are surface-coated with a scant, well-bonded film: i.e., the (urethane) reaction product of the isocyanate-terminated polymer lubricant and the surface hydroxyls—(or the analogous ester product of the acid-terminated polymer).

Fluorocarbon liquid films are generally known as useful to lubricate magnetic recording media (e.g., rigid discs of the Winchester type; cf. pp. 1073+of IEEE Transactions on Magnetics, Vol. MAG-18, No. 6, November 1982). Such lubricants have desirable properties (oxidative and thermal stability, chemical inertness, wettability, viscosity range, etc.), but the mass of lubricant on the disc must be carefully controlled. If there is too little, head-wear is excessive and "crashes" can occur. If too much lubricant is applied, puddling and "stiction" of the head can occur; e.g., during "start-up". This can result in distortion of a head flexure and disc damage (and so can lead to a latent failure situation; cf. all the factors which cause "stiction" are not known, but excess lubricant seems to be a major contributing factor).

General Aspects of Embodiments

Certain salient features of our developments will come to mind upon review of this specification.

For instance, we prefer to formulate our lubricant system to comprise an initial layer of isocyanate-terminated (and/or acid-terminated) polymer lubricant. Our lube systems are particularly apt as a surface-lube film for "in-contact" media (i.e., media characterized by continual, or periodic, frequent contact of a thin film head therewith—as distinguished from media which are seldom, if ever, so contacted; e.g., when the head usually "over-flys").

Such an "isocyanate-lube film" (or acid-terminated film) may be understood as a "reactive lubricant"; i.e., one with end-molecules that firmly attach themselves to the record surface (cf. polymeric recording surface of a magnetic record disc). To break such a bond and cause spin-off and depletion of the lube, energies of 128 to 84 k. cal/per molecule are seen as required. This is far greater than the mechanical forces developed on any spinning disc record.

A "reactive lube" should have a characteristic "bonding molecular structure"; i.e., a carbon chain exhibiting lubricant properties, with one or several apt "reactive" terminal groups which are capable of further reaction.

A preferred substrate record surface for our reactive lube film will be characterized by discrete surface molecules exhibiting, or capable of generating, reactive groups (especially hydroxyls) apt for reacting with acid or isocyanate terminations to form a "strong bond". Curing reactions which take place may also produce additional functional groups. For example, epoxy and/or phenolic binder resins used in recording embodiment coatings herein evidently contain such hydroxyl groups, or can readily be made to do so—as can most magnetic record binders.

Typical structures for such an epoxy (Epon 1004) and phenolic (Methylon 75108) are shown below (an E-P type binder):

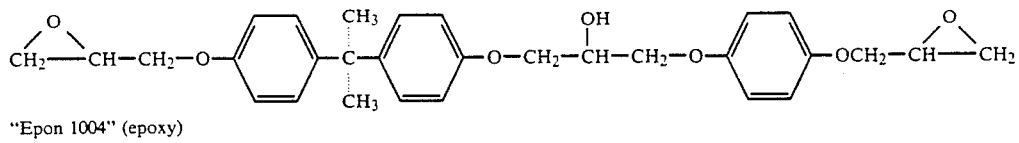

"Epon 1004" (epoxy)

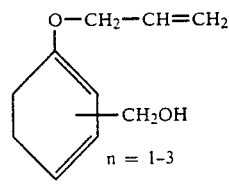

"Methylon 75108" (phenolic)

In addition, the curing reaction of such binders can produce useful ester or esters, depending upon the resin and the relative rates of the various reactions. A related uncatalyzed reaction is shown in simplified form as:

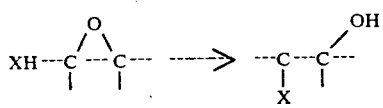

Whereas a catalyzed reaction can yield an ether; as:

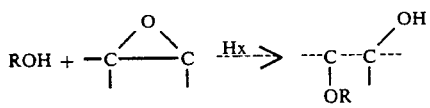

Thus, the unreacted binder resins produce such functional hydroxyl groups, as well as resins which are partially reacted or fully reacted (cross-linked). We have seen evidence of such hydroxyl groups, of such ester groups and of the disappearance of epoxy groups in instances like some embodiments herein A salient feature hereof is that the reaction of hydroxyl groups on the disc record-surface with isocyanate of our lube surface-coat yields a urethane bond at the surface of the disc, firmly adhering the isocyanate-lube on the magnetic recording coating.

A particular preferred isocyanate which forms the basis of such a "reactive lube" according to this invention is produced from a "diol" (e.g., a fluoro-poly-ether-diol) and a di-isocyanate; to combine, and produce a short-chain fluoro-alkyl polymer that is di-isocyanate terminated, i.e., a "Disoc" as here understood.

Workers will see that magnetic, in-contact digital recording surfaces may be enhanced and made more practical commercially (reasonably low depletion, high durability/life) by a mere coating with our novel "reactive-Disoc-lubricant" (or a related acid-terminated analog)—as the following Examples will show in some detail.

One preferred embodiment involves the application and reaction of a fluorocarbon diisocyanate "reactive lube" with functional terminal hydroxyl groups on the magnetic recording surface to form a cross-linked surface layer with urethane bonding of the lube to the surface. The diisocyanate is preferably based on a fluorocarbon lube and materials which are available commercially; and can be readily prepared from available materials. The "reactive-lube" system and process described in this embodiment involves, in preferred forms:

a) readily obtainable materials;
b) specifically a diisocyanate-terminated and/or acid-terminated lube, particularly a fluorocarbon giving a stable "reactive-lube-undercoat" layer on record-surface, especially where this "under-coat" exhibits cross-linked fluorocarbon;
c) reaction with functional (especially hydroxyl) groups on the disc surface, to be firmly bonded thereon;
especially via urethane bonding and/or ester bonding between the record surface and the undercoat (readily induced; e.g., by heating an hour or so at about 100° C.);
d) controlled lube film thickness;
e) an additional super-posed surface-lubricant layer applied which is mutually soluble in the."reactive undercoat", and so is better retained thereon;
f) good wear characteristics;
g) little or no appreciable depletion rate (spin-off); and
h) easily applied; and with
i) super-coat of surface-lubricant retained on undercoat via mutual solubility, etc..

The convenience and facile nature of such a lube-retention expedient will recommend itself to workers, e.g., as opposed to conventional relatively expensive/-cumbersome expedients like surface-etching.

While a number of chemical reactions can be used to bond such reactive layer lubricant molecules to a (disc) record surface, we believe our "reactive isocyanate" mode is best, considering material availability, reaction rate, stability of the reacted layer, and effectiveness. Other methods of attachment, such as esterfication, etherfication, etc. will prove more difficult to carry out and give products which are less stable.

Our polymeric isocyanate lubricants may be synthesized from the corresponding materials as workers recognize. Preferred starting materials include fluorinated polymer lubricants such as poly(perfluoropropylene oxide) di-carboxylic acid, and poly(perfluoroethylene oxide) di-carboxylic acid.

In a preferred form of the present invention, the mentioned layer of like-structure surface-lubricant is super-posed atop the "reactive lube" under-layer, preferably retained there by inter-molecular attraction, by good inter-solubility and/or by inter-diffusion between the two layers (which thus have basically similar structures and, preferably, an identical "backbone". Spin-off and like depletion is thus inhibited, if not essentially eliminated.

The invention will be better appreciated by workers upon consideration of the following detailed description of some preferred embodiments.

DESCRIPTION OF PREFERRED EMBODIMENTS

General Description, Background

Example I illustrates a magnetic (disc) recording substrate coated with a recording composition, and then a lube system formulated and applied according to principles of this invention.

This, and other means discussed herein, will generally be understood as selected, formulated, and operating as presently known in the art, except where otherwise specified. And, except as otherwise specified, all materials, methods, and devices and apparatus herein will be understood as implemented by known expedients according to present good practice.

A relatively conventional magnetic record polymeric coating will be understood as disposed on a rigid computer disc according to the invention, and modified to include a novel isocyanate-terminated lubricant layer.

Following is a specific Example of such an isocyanate lube system embodiment used in the practice of the present invention. This composition is prepared to include the mentioned components in indicated concentrations, and to be applied, processed and used as indicated.

Ex. I

A magnetic disc record of the type coated with a polymeric magnetic recording film (magnetic oxide in polymeric epoxy-phenolic type binder (see E-P above) for Write/Read in-contact with slider) is presented for surface lubricant treatment according to the invention.

The record surface is assumed to have been finally treated (e.g., polished, burnished, degreased and otherwise fully cleaned), except for surface lubrication and related steps.

A fluorocarbon polymeric "reactive lubricant" exhibiting isocyanate end groups is prepared (cf. "Disoc" as above; e.g., molecular weight about 2000) and is applied sparingly to the recording surface of the disc to give a scant, uniform, relatively continuous, minimum-thickness surface coating. After sufficient time, at operating temperature (e.g., can be heated to accelerate cure), to assure appropriate degree of cure (surface-bonding of binder hydroxyl, with reactive isocyanate end-groups and urethane-bond the record surface material), a "strip" step may be executed, removing unwanted, uncured material and further assuring a scant, uniform residue film left on the record surface. Alternatively and preferably in many cases, this "strip" is replaced by a "quench" whereby unreacted isocyanate terminations are inhibited from later reacting (e.g., by contact with an azeotropic mixture of Freon TF and alcohol).

Preferably, the polymeric binder presents free, reactive (cf. OH—) groups apt for chemical bonding with the lube's isocyanate end-groups. Such reactive hydroxyl can be developed, as workers know, in many common binder polymer moieties, such as on the phenolic and the epoxy portions (e.g., cf. opening of epoxide ring).

The reactive isocyanate groups are very reactive here; and may pick up unwanted contaminants like moisture —thus an inert atmosphere (e.g., $N_2$ blanket) may be in order, e.g., until curing finished.

The record may now be used, or, if one wishes to further assure optional surface lubrication, a compatible super-lubricant film may also be applied (e.g., preferably a like fluorocarbon lubricant).

Workers will note that the scant isocyanate-lube reactive film (prefer 40–90 Å) seems to yield good lubricating characteristics of itself, and especially when supplemented with a like lubricant super-coated on the film. Spin-off and other lube depletion seems markedly inhibited.

We assume (though it is not certain) that the record surface has essentially been modified by this isocyanate film, from the original relatively hydrophobic, highly polar surface to a "lower-energy" surface e.g., more compatible with a lube super-coat). Evidence of this is the fact that relatively little spin-off occurs. Such a coated record appears to exhibit superior lubricant characteristics over extended use; e.g., easily passing standard CSS (Contact Start-Stop) tests; e.g., 10–20 k. CSS.

Of course, for increased toughness, load-bearing and durability, the isocyanate-lube will be prepared to exhibit moderate-to-high molecular weight (e.g., at least several thousand). Also, excess thickness will be avoided lest too much unreacted (unbonded) lube material remain and "soften" the lube film.

Ex. II

A record disc is lube coated as in Ex. I, with the isocyanate-lubricant comprising a pair of isocyanate end groups on a relatively short, low molecular weight fluoro-alkyl chain, being sponged on the recording surface uniformly in a Freon diluent (up to a few wt. % therein), and buffed or otherwise worked to spread more uniformly. Like results are obtained.

Ex. III

Ex. II is replicated with a di-isocyanate formed on a fluoro-ether polymer backbone. Like results are obtained.

Ex. IV

Ex. I is repeated, using a higher molecular weight isocyanate-terminated lube (e.g., 3–4000 or more) for the "reactive film" and no super-lubricant added on the reactive film—which will thus serve as the sole "surface-lubricant". This may be satisfactory for "light" service (e.g., only a few k.-CSS, or with a ferrite head, rather than a thin film head).

Ex. V

Ex. III is replicated, with a second layer ("top-layer") of surface lubricant superposed atop the di-isocyanate-terminated fluoro-ether reactive film. This "top layer" is of suitable thickness and similar structure to reactive film (e.g., fluoro-ether lube also). It will be seen as retained in place better than . conventionally (i.e., better than where no such "reactive film")—evidently because of the inter-molecular attraction, etc., between like layers, and because the underlying "reactive film" is so firmly bonded to the record surface.

Ex. VI

Ex. III is replicated, with the di-isocyanate-lube polymer prepared from a poly(perfluoro alkylene oxide) compound. Acceptable methods and materials for preparing such are known in the art; for example, some are disclosed in U.S. Pat. No. 3,810,874 and in U.S. Pat. No. 4,085,137, both incorporated herein.

The so-developed isocyanate-terminated "reactive lube" is coated as in Ex. I–III, etc., on the recording surface and reacted there, then excess unreacted material stripped away. The isocyanate end-groups should eventually form urethane bonds with the free hydroxyl moieties in the (epoxy-phenolic) binder on the record surface. These chemical bonds are very strong and will resist all conceivable spin-off forces. The scant (e.g., several dozen Å) isocyanate film left is then coated with a "surface-lubricant" readily soluble in the (isocyanate) reacted film. Preferably this surface-lube is a relative high m.w. perfluoropoly ether (Z-60, Z-25, based on polyethylene oxide types by Montedison, etc.); and will be mutually soluble, etc., in the reacted film (isocyanate) and so be better retained thereon and resist spin-off and like depletion.

Results are satisfactory as above.

Ex. VII

Ex. VI is replicated, with a "Disoc" type perfluoropolyether, isocyanate-terminated "reactive lube" film as described above, with the record surface including epoxy and phenolic binder polymers (e.g., as "EP Binder" described above).

The "Disoc" is applied and heat-cured until about 80–95% reacted (e.g., about 100°–110° C. for about 90 min.) to yield urethane bonding—with excess unreacted unbonded Discoc then removed to yield a scant isocyanate-film of about 40–90 Å (pref. 50–70 Å) or, in any event, whatever it takes to form just one or several continuous, mono-molecular layers, if at all possible ("ideal thickness").

The results are satisfactory as before, with relatively little lube spin-off, no "stiction" or "head corrosion"

problems and with good operational durability (e.g., passes 10-20 k.+Contact Start/Stop cycles). No toxicity or environmental problems will be seen [e.g., surprisingly, no water-uptake problems will be seen, and the so-lubed disc will give extended service even in high heat-humidity conditions].

Ex. VIII

Ex. I is replicated, except that the reactive-film (fluorocarbon) lubricant is modified to include acid terminations appropriate for ester-bonding with the record surface (e.g., with reactive OH groups found, or induced therein—as can be done with virtually any current record binder). These acid terminations may be substituted for the isocyanate terminations, or supplemented thereto.

Ex. IX

Ex. VII is replicated, with the reactive film "Disoc" lube (isocyanate-terminated perfluoro poly ether) prepared as follows:

1) A suitable form of carboxylic acid is mixed with a suitable di-isocyanate in a solvent therefor—preferably $\alpha, \omega$ terminated carboxylic acid in Freon TF (cf. about 50 ml. Freon tri-chloro tri-fluoro ethane) mixed with (an aliquot) 2, 4 toluene di-isocyanate.

2) The mixture is stirred for about one hour; then the solvent evaporated, leaving a "Disoc" product: i.e., $\alpha,\omega$ di-isocyanate of a perfluoro poly ethylene oxide polymer.
   [as workers recognize, a -polypropylene oxide Disoc analog may likewise be prepared and substituted here]

3) The "Disoc" is applied to the medium surface e.g., diluted in suitable solvent, and cured, so a suitable number of urethane bonds form with the surface -OH groups.
   more particularly, this "Disoc" may be dissolved in Freon TF (0.5-2 wt. % strength) and applied via sponge applicator, or any like means, yielding as uniform a thickness as possible [e.g., initially 5-20 mg., corresponding to thickness of about 150-600 Å]
   Alternatively, one may wipe-on, spin-on, spray-on or the like; and the Disoc may be otherwise diluted, or applied full strength.
   It is usually necessary to buff, or similarly "work" the rather viscous Disoc, to spread it more evenly across the record surface.

3A) curing (decomposition to effect urethane bonding) may be done by any convenient practical method that yields the appropriate degree of urethane bonding with reasonable time and expense. We have found that heating (oven) for about 1.5 hours at about 100°-120° C. is satisfactory (e.g., 90-95% bonding by available isocyanate).
   since the isocyanate is so active, it may be advisable to screen-out unwanted reactants (e.g., moisture) with an inert atmosphere (e.g., $N_2$ blanket) until the cure-period is concluded.

4) Unreacted material (unbonded isocyanate, etc.) is preferably removed (e.g, washed off with Freon TF or like solvent).
   The remaining "reacted-lube" film (pref. 40-90 Å thick, and uniform, continuous across record surface) will be found to be firmly bonded to the record surface (urethane bonds).

The results are, otherwise, as before.

Ex. X

Use of Fomblin:

Ex. IX is replicated with the reactive film "Disoc" lube comprising a "Fomblin-Z" material (supplied by Montefluos Co., Montedisen Group, Rome, Italy), the structure and characteristics given as follows:

"Fomblin-Z" Disoc $\alpha\omega$-perfluoropolyether-bis-carboxyamyde-tolylen-isocyanate

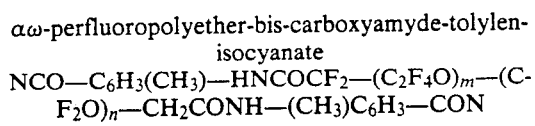

Typical Characteristics

| | |
|---|---|
| Solubility in Mek. | 0.3-0.5% |
| Average Molecular weight (NMR) | 2000 ± 400 |
| Ratio of groups $C_2/C_1$ (NMR) | 0.7 ± 0.2 |
| Equivalent weight (amination) | 1100 ± 200 |
| Acidity in 100 g of product | less than 5 acid milleequivalent |
| Specific gravity (20° C.) | 1.62 kg/l |
| Molecule length | 82 A° |

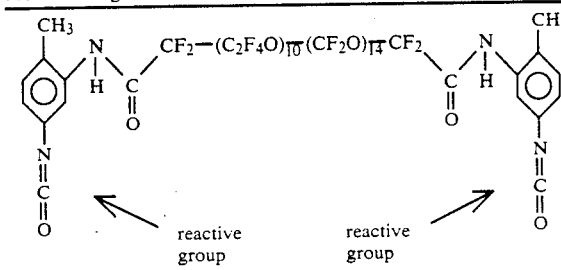

Results are as before, generally.

Other suitable polyfluoroethers with active isocyanate end groups may be used; e.g., Krytox, a perfluoro poly propylene oxide derivate (and cf. like perfluoro poly ethylene oxide derivatives). However, related fluoro polymers like tetrafluoro ethylene are unsuitable (e.g., having a long chain and no like active end groups).

Processing is given above; however Table A below gives some preferred, more specific versions.

TABLE A

"Std. Disoc Treatment"

After "standard" computer data rigid disc is coated with magnetic recording coat of mag. oxide, etc., in epoxy-phenolic binder, dried, etc., some preliminary steps are common, as:

| | |
|---|---|
| (A-1) | Polish: record-surface polished to smooth |
| (A-2A) | Rebake: (e.g., in over) to oxidize surface, remove organics, raise melting point (vs "tacky-ness", binder-melt) |
| (A-2B) | Wash: clean-off oven rebake contaminants in many cases, steps 2A, 2B are eliminated |
| (A-3A) | Alcohol wipe: clean before burnish; e.g., with isopropyl alcohol |
| (A-3B) | Burnish: remove "peaks" on record-surface |
| (A-3C) | Degrease: remove alcohol residuals and any other residual contaminants |
| (A-4A) | Apply "Disoc" (reactive lube film) - see also Table B - sponge-on "Disoc" (auto. applicator, diluted in Freon TF - to about 20 mg. ( ~ 600 A°) Buff-to-spread evenly; may need $N_2$ blanket vs $H_2O$ uptake; e.g., about 50-90 A°; 60% reacted here |
| (A-4B) | Heat-to-react (e.g., in oven) Bake ~1-2 hrs. @ 100-120° C.; react to about 90% |
| (A-4C) | Strip-away "Disoc" residue (Degrease) |

TABLE A-continued

"Std. Disoc Treatment"

|   |   |
|---|---|
|   | remove unreacted "Disoc"; e.g., Freon TF condensed on disc |
| (A-5) | Apply lube super-coat (e.g., 10–30 k m.w.) e.g., dip-coat Z-25 onto "reacted film" of "Disoc" - DON'T disturb "reacted Disoc surface", leave wholly untreated, thereafter, perform normal "completion" steps; e.g., "glide", "wipe" and "certify". Results: |
| (A) | - reduced spin-off: e.g., where control; spun @ 6000 rpm for 1000 hrs.: 74 A° → 40 A° 2000 hrs.: → 30 A° or likely crash! vs Disoc-coat under super-lube: spun @ 6000 rpm 1000–2000 hrs.: 74A° → 72 A° |

Further preferred process specifics for Disoc application are given in Table B as follows.

TABLE B

Apply "reactive lube"

| | |
|---|---|
| 1. | Apply sufficient "reactive lube" on disc surface. Preferred application mode: Conc. lube solution: 0.1–0.5% in diluent Flow rate: 5 ml/min. (from TF) Application time: 14–54 sec. |
| 2. | Buff lube uniformly on surface to leave somewhat in excess of a mono-layer. Preferred Buff mode: Buff pressure: 100 psi–225 psi Buff speed: 400 rpm–900 rpm Buff time: 14 sec.–54 sec. |

Now, workers are aware of the concept of applying certain lubricants containing highly polar groups on recording media (e.g., see U.S. Pat. No. 4,268,556) and of bonding a lubricant on a record surface by generating a highly reactive carbene which reacts with the surface in some manner (e.g., see U.S. Pat. No. 4,446,193 or U.S. Pat. No. 4,120,995). A related bonding of a telechelic polyether is suggested in U.S. Pat. No. 4,268,556 (evidently depending upon loose molecular associations called "van der Walls forces", rather than discrete chemical bonds, though thermal stability and "spin-off" would be inferior to a more firmly chemically bonded system, and lubricity would probably be inferior too).

U.S. Pat. No. 4,446,193 describes a chemically-reacted lube system. It involves a rather problematic synthesis of a diazoketone, and subsequent decomposition thereof to a carbene. The synthesis of the diazoketone is complicated; also purification of the product is a problem. In order to form the carbene intermediate, temperatures of ca., 200° C. must be used; alternatively, U.V. exposure can be used, though U.V. absorption by a thin layer of diazoketone would likely be minor and thus inefficient. While the carbene can react with a record surface, it is difficult to determine the course of the reaction. The carbene can, in fact, react with itself, which would reduce its effectiveness.

The '193 patent also states that carbenes can react with metal oxides but no specifics are given. It is, in fact, unknown whether the reaction with metal oxides produces a useful species.

U.S. Pat. No. 4,120,995 teaches (chemically) bonding a lubricant to a substrate; as does European Patent No. 123707 (Nov. 7, 1984). This '707 patent appears to use a fluorocarbon undercoat with silicon-bonding to the substrate (a bonding expedient somewhat different and less efficient than urethane bonding; also less stable, being apt for hydrolysis into Hcl, and presenting a serious risk of corrosion and toxicity). European '707 also seems to suggest the possibility of using a surface-lube overcoating, but employs fluorocarbon end-groups to retain this on a protective-film (analogous to our "undercoat"), seemingly a weaker, less stable retention mechanism.

To recapitulate, our Examples describe an isocyanate-terminated (or acid-terminated) "reactive lube undercoat" to inhibit lube depletion (e.g., spin-off of a lube super-coat). This is done by applying and chemically-bonding such an undercoat on virtually any conventional polymeric magnetic recording surface susceptible of exhibiting appropriate functional groups to react with the isocyanate (or acid-) and produce strong bonding (e.g., this is true for essentially all polymer binders used with disc media of the type used to record high density digital data for high-speed data processing), with spin-off reduced. As described, this very thin undercoat should be well cured on the recording surface (with most uncured material removed).

Subsequent application thereon of a relatively conventional like-structure, like-solubility surface-lube system (e.g., a fluoro-alkyl as described) is also very effective, yielding a novel, surprising "lube-on-lube" two-layer coating which is highly stable and resistant to spin-off depletion, and thus is superior for such high speed computer operation with a conventional TF head-"slider", etc.

The isocyanate (or acid)-terminated "reactive lube" films of this invention will be seen to increase lubricant retention on magnetic disc coatings to give better wear characteristics and longer and more reliable product life.

It will be understood that the preferred embodiments described herein are only exemplary, and that the invention is capable of many modifications and variations in construction, arrangement, and use without departing from the spirit of the invention.

Further modifications of the invention are also possible. For example, the means and methods disclosed herein are also applicable for other like (in-contact, computer) recording media. Also, the present invention is applicable for providing a lubricant system in other analogous situations (such as for other "in-contact" media).

The above examples of possible variations of the present invention are merely illustrative. Accordingly, the present invention is to be considered as including all possible modifications and variations coming within the scope of the invention as defined by the appended claims.

What is claimed is:

1. A method of reducing depletion of lubricant applied on the polymeric recording surface of a high speed magnetic data recording medium, this method characterized by contacting the recording surface with an isocyanate polymeric compound having isocyanate-terminations and decomposing this compound there to form an array of urethane di-bonds having both end-groups bonded on the recording surface, with the compound being left as a continuous uniform protective film of minimum thickness.

2. The method of claim 1 where the compound is a di-isocyanate-terminated fluorocarbon lubricant, and it is selected and treated to form urethane bonds with active hydroxyls in the binder of the recording surface.

3. The method of claim 2 where the compound is, in turn, coated with a surface lubricant of similar fluorocarbon structure.

4. The data recording medium coated according to the method of claim 3.

5. A data recording medium coated according to the method of claim 2.

6. The method of claim 2 wherein in the isocyanate compound comprises a fluoro-poly-ether.

7. A data recording medium coated according to the method of claim 6.

8. The method of claim 6 wherein the isocyanate compound comprises a perfluoropolyether-bis-carboxyamyde-tolylen-isocyanate.

9. A data recording medium coated according to the method of claim 8.

10. The method of claim 8 wherein the medium is adapted for in-contact operation with a fairly abrasive transducer means.

11. The method of claim 8 wherein the isocyanate compound has a molecular weight of from about one- to two-thousand up to several thousand.

12. A data recording medium coated according to the method of claim 11.

13. The method of claim 1 where the compound is a fluoro-poly-ether.

14. A data recording medium coated according to the method of claim 13.

15. A data recording medium coated according to the method of claim 1.

16. A method of reducing depletion of a liquid surface lubricant polymer $L_s$ adapted for application on the recording surface S of a high speed magnetic data-recording medium M, but subject to spin-off therefrom, this method characterized by:

selecting or treating medium M. so that surface S thereof is characterized by a relative abundance of reactive hydroxyl groups Sg thereon:

contacting surface S with a reactive, non-corroding long-chain polymeric, high molecular weight non-oxidizing reactive-lubricant material R; R including a isocyanate reactive end-group Rg on either end of its intermediate backbone section $R_B$; reacting groups Rg on surface S so that each may form a chemical bond with a respective surface group Sg, thus rendering a solid reactive coating CR di-bonded on S, with both end-groups Rg. bonded on S and with intermediate backbone $R_B$ left unreacted and presented away from S in "exposed" condition;

then, applying surface lubricant polymer $L_s$, upon coating CR, polymer $L_s$, being selected to be sufficiently like the intermediate "exposed" backbone structure of reactive lube R and sufficiently soluble therein to interpenetrate into CR and develop enhanced VanderWalls, dipole and dispersion bonding to CR to better resist spin-off.

17. The method of claim 16 wherein;

surface S is adapted, and/or treated, to exhibit sufficient reactive groups Sg to yield relatively complete reaction with both isocyanate end-groups of reactive lube material R and produce a relatively continuous mono-layer of reacted material CR along surface S; the isocyanate end groups thus being chemically bonded to S and so rendered non-reactive, leaving the backbone $R_{BB}$ of reactive lube R to so affinity-bond with polymer $L_s$ and better hold it on the medium M; this di-bonding of the reactive lube R, together with affinity of the surface polymer $L_s$ to said backbond serving to provide superior resistance to lubricant spin-off and like depletion phenomena.

18. The method of claim 16, wherein;

an excess of reactive lube material R is applied to surface S, and reacted there, so-bonding all isocyanate terminations; then the unreacted material R is removed.

19. The method of claim 18, wherein;

upon so contacting reactive-lube material R with surface S, surface S is heated sufficient to enhance the reactivity of said hydroxyl groups thereon;

wherein medium M comprises a rigid magnetic recording disk; and where a thickness of about 30–140 Å of reacted material R is left as coating CR on surface S, so-bonded thereto, with the rest of the applied material R stripped away, about 240 Å to 2000 Å or more having been originally applied to S.

20. The method of claim 19, wherein;

excess reactive lube material R is removed by a solvent wash and about 30–80 Å is left as coating CR.

21. The method of claim 18, wherein, either, or both surface lubricant $L_s$ and reactive-lube material R consists essentially of perfluoro-polyether, fluoro-polyether, perfluoro-polyester or fluoro-polyester.

22. The method of claim 21, wherein:

surface S comprises magnetic particles dispersed in a polymeric binder, this binder exhibiting reactive surface hydroxyl groups.

23. The method of claim 16, wherein;

medium M is on a rigid magnetic recording disk, with an abundance of active surface hydroxyls.

24. The method of claim 23, wherein recording surface S consists of a thin film of deposited magnetic recording material.

* * * * *